United States Patent [19]

Turner

[11] 4,239,202
[45] Dec. 16, 1980

[54] SHEET DISPENSER

[75] Inventor: George F. A. M. Turner, Ingatestone, England

[73] Assignee: Ciba-Geigy AG, Basel, Switzerland

[21] Appl. No.: 887,270

[22] Filed: Mar. 16, 1978

[30] Foreign Application Priority Data

Mar. 23, 1977 [GB] United Kingdom ............... 12180/77

[51] Int. Cl.³ ............................................. B65H 3/00
[52] U.S. Cl. ................................................... 271/18
[58] Field of Search ................. 271/18, 113, 115, 131, 271/137; 221/289

[56] References Cited

U.S. PATENT DOCUMENTS

| 3,511,496 | 5/1970 | Zoglmann | 271/37 |
| 3,790,160 | 2/1974 | Schmidt | 271/18 |
| 3,960,291 | 6/1976 | Navi | 271/18 X |

FOREIGN PATENT DOCUMENTS 95890  6/1939  Sweden ..................................... 271/113

Primary Examiner—Richard A. Schacher
Attorney, Agent, or Firm—Harry Falber

[57] ABSTRACT

A sheet dispenser for dispensing sheets one at a time from a stack of notched photographic X-ray film sheets. The essential part of this device is a pendulum which is capable of swinging from side to side across the sheets, which are stacked at a slight angle to the vertical, and also back and forth in the plane of the thickness of the sheet stack. The pendulum is made from a roller which has a plough release member attached to it. When the pendulum is moved sideways until it is in line with the notch on the uppermost sheet the release member locates into the notch, and, as the sideways movement continues, ploughs under the sheet and detaches it, allowing it to fall under the action of gravity. The pendulum then moves sideways in the opposite direction, remaining in contact with the next sheet, until the release member locates into the notch on the next sheet whereupon the plough detaching operation is repeated.

4 Claims, 4 Drawing Figures

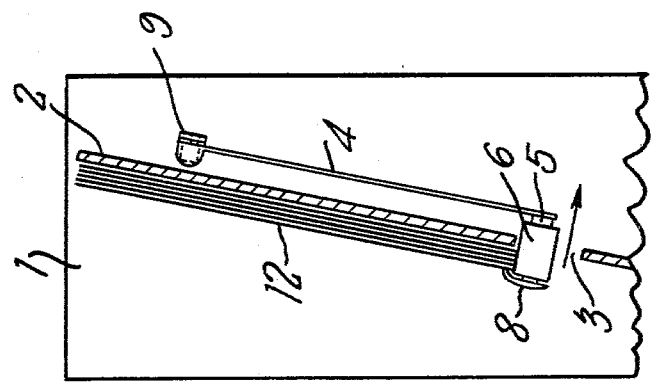
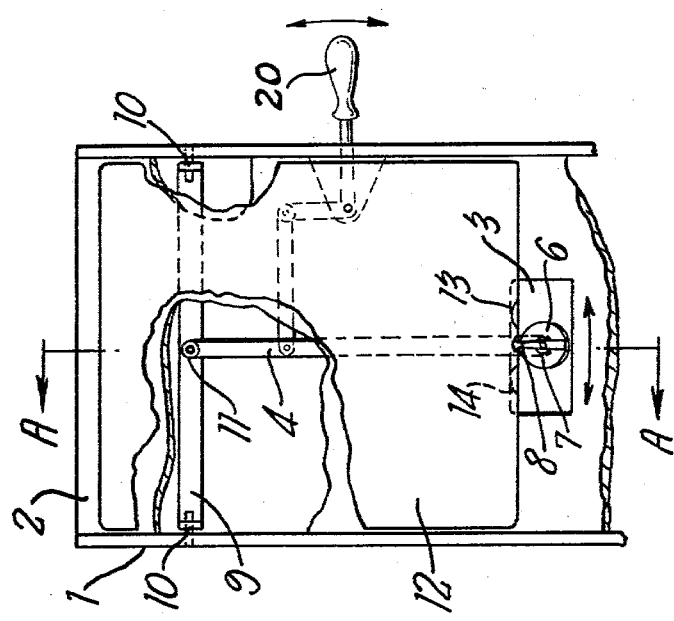

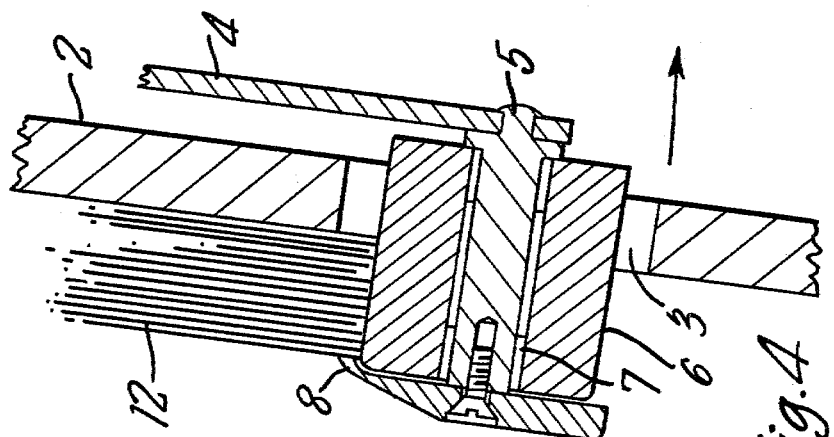
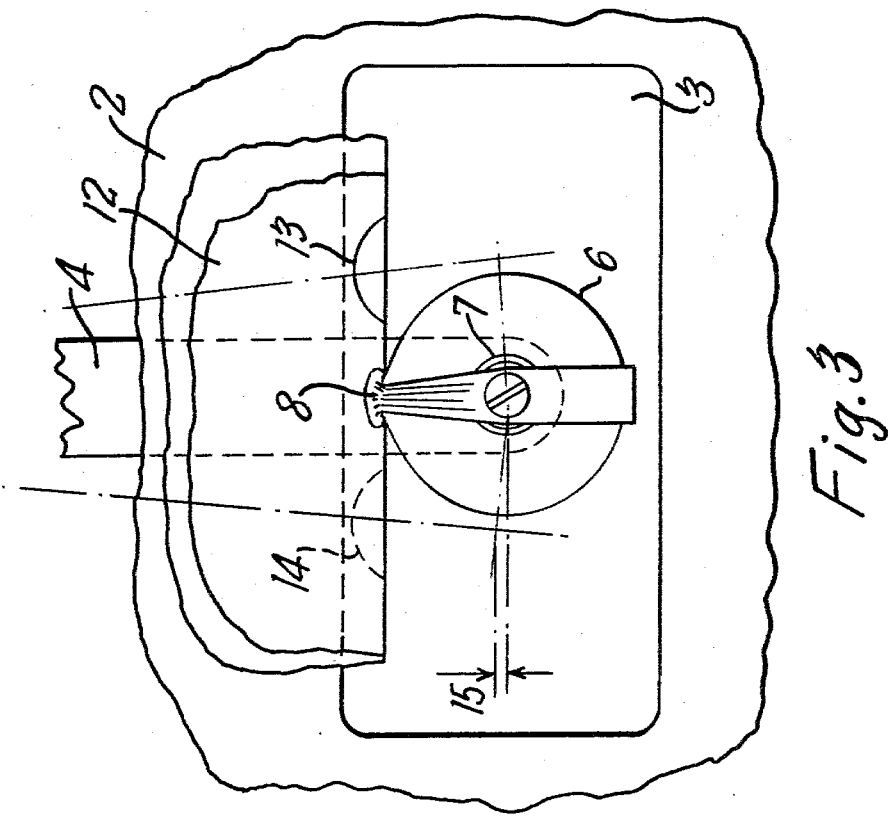

SHEET DISPENSER

This invention relates to a device for dispensing sheets of film material one at a time from a container which holds a stack of sheets.

It is particularly useful to be able to store a stack of film sheets for example X-ray film sheets in a light tight stack and to be able to dispense sheets from this stack one at a time. In recently introduced systems for handling X-ray films it is required that X-ray films are handled, that is to say, dispensed, exposed and processed under daylight conditions. To do this the X-ray film must be enclosed in a cassette during exposure and be transferred from the cassette into light tight containers for processing and storage.

Most X-ray films are assembled in a stack without interleaving paper and it has been found fairly difficult to separate individual sheets from the stack and load them into a cassette without scratching or bending the X-ray film. One step in the solution of this problem has been the introduction of so called notched films; these are described in B.P. Specification No. 1361013. In this specification there is described a stack of photographic film sheets which is composed of first and second sheets, each first sheet having a cut away portion of small area along one edge of the sheet and being in supposition to form a first discontinuous row, and each of the second sheets having a cut away portion of small area along the same edge of the sheet to form the second discontinuous row spaced from the first discontinuous row.

It is the object of the present invention to provide a device to separate such notched sheets from a stack one at a time.

According to the present invention there is provided a sheet dispenser for dispensing sheets from a stack one at a time, each sheet having a notch along the bottom edge as it is held in the stack, the stack comprising alternate first and second sheets with the notch in all the first sheets being aligned in a first row and the notch in all the second sheets being aligned in a second row, the dispenser comprising a housing in which the stack is inclined vertically in a stack holder, the bottom of the stack resting on a side-ways movable stack support member, to one end of which is attached a sheet separator member which in the inoperative position of the dispenser abuts a face-portion of the bottom edge of the topmost sheet of the stack thus keeping the stack in the holder, the abutted portion of the sheet being smaller than any notch in the sheets of the stack, together with means to move the stack support member across and beneath the sheet stack so that the sheet separator member is stopped at the notch position in the topmost sheet thus abutting the next-to-topmost sheet so enabling the topmost sheet to fall by gravity from the stack over the sheet separator member and means to move the stack support member in the opposite direction which causes the topmost sheet to separate from the stack if it has not already separated, the said stack support member being so mounted in relation to the stack holder that the sheet separator member always abuts either the topmost sheet in the stack or the next-to-topmost sheet through the notch in the topmost sheet.

By inclined vertically is meant that the stack is supported vertically or inclined backwards not more than 30 degrees.

In one embodiment of the invention the stack support member is mounted on one end of a pendulum which is located on the opposite side of the stack holder to that side which supports the film stack, the said pendulum being pivotally mounted so that the sheet separator member, which is mounted on the stack support member which is in its turn mounted on the pendulum, is caused to abut the film stack.

In another embodiment of the invention the stack holder is pivotally mounted so that the top-most film thereon is biassed towards the sheet separator member mounted on the stack holder. This biassing may be effected for example by a spring mounting or by means of a weight.

When the dispensing device of the present invention is in operation sometimes the topmost sheet will fall by gravity from the stack sliding over the next-to-topmost sheet when the film separator member abuts the next-to-topmost sheet through the notch in the topmost sheet. In general however it is required that separator member moves underneath the bottom edge of the topmost sheet in order to overcome the frictional force which causes the sheets to adhere in the stack.

In operation the film stack is placed in the dispenser so that the sheet separator member abuts the topmost sheet in a position towards or at the centre of the lower edge of the face of the topmost sheet, that is to say between the two discontinuous rows of notches in the film stack. The stack then rests on the stack support member. To operate the device the stack support member is moved to the notch on the topmost sheet so that the sheet separator member abuts the next-to-topmost sheet through the notch, then the stack support member is moved back towards the centre of the next-to-topmost sheet and the topmost sheet leaves the stack. If it is required that more than one sheet is dispensed straight away the stack support member is then moved farther in the same direction so that the sheet separator member then abuts what is now the next-to-topmost sheet through the notch in the topmost sheet. Thereafter the stack support member is moved back towards the centre of the topmost sheet and either stops at this position or continues so that the sheet separator member enters the notch on this film. Preferably the stack support member is moved by means connected to a handle which is located outside the framework of the sheet dispenser. This handle is conveniently operated by hand as the speed of operation is such that the sheets should be separated from the stack and collected for the next operation at a sufficiently low speed to prevent sheets stacking together at an exit chute from the device.

In the sheet dispenser of the present invention it is possible to arrange for a cassette to be inserted into the exit chute from the stack and for the sheet dispensed from the stack to fall into the chute exit and for the cassette to be closed and removed from the device without any ingress of light into the dispenser.

Thus the film sheet dispenser of the present invention is of particular use for dispensing light sensitive film sheets particularly X-ray film sheets, and it is important that the film sheet dispenser should be made completely light tight when so used.

In one embodiment the stack support member is a roller which is free to rotate and which is mounted on the pendulum. Movement of the pendulum causes the sheet stack supported on the roller to move up and down very slightly in operation and thus helps to keep the bottom edge of all the sheets in the stack in contact with the stack support member.

The accompanying drawings will serve to illustrate the invention.

FIG. 1 is part sectional front elevation of part of the film sheet dispenser of the present invention.

FIG. 2 is a cross sectional side elevation of the same view as FIG. 1 along the lines A—A of FIG. 1.

FIG. 3 is an enlarged view of the stack support member as shown in FIG. 1.

FIG. 4 is an enlarged view of the stack support member as shown in FIG. 2.

In all the figures the same numbers have the same signification.

The film sheet dispensing device comprises a light tight frame 1 having mounted therein a sloping stack holder 2. The sloping stack holder 2 is inclined backwards from the vertical at an angle of 10 degrees. The stack holder 2 has a cut-out portion 3. Located behind the stack holder 2 is a pendulum 4 which has a spindle 5 on which is mounted a roller 6 which runs on bearings. The roller 6, which incorporates bearings 7, is supported on the spindle 5 and constitutes the stack support member. Attached to the spindle 5 is a sheet separator member 8.

The pendulum 4 is attached to a strut 9 which is mounted on bearings 10. The pendulum 4 is hinged to the strut 9 by a pin 11. As shown particularly in FIG. 2 the roller 6 and sheet separator member 8 protrude through the cut-out portion 3 of the sloping stack holder 2.

The stack of film sheets 12 rests on the stack holder 2 and is held up by the roller 6. The top most sheet of the stack has a cut-out notch 13 and the next-to-topmost sheet has a cut-out notch 14. This is indicated in FIG. 1 in light lines to indicate that it is not visible in this view. There is a discontinuous series of notches below notch 14, that is to say alternate sheets have a notch at equal distance but on opposite sides of the centre line of the stack.

The film stack 12 is loaded into the apparatus so that it is located as shown in FIGS. 1 and 2 so that the end of the stack supporting member 6 lies between the two discontinuous rows of notches indicated by 13 and 14. The top of the separator member 8 abuts the bottom edge of the top-most sheet in the stack 12. The pendulum 4 is mounted on the strut 9 which is able to rotate slightly on the bearings 10. Thus the weight of the roller 6 tends to cause the member 4 to be biassed in the direction of the arrow shown in FIG. 2. This ensures that the top of the sheet separator member 8 always abuts the topmost film or the next-to-topmost film through the notch in the topmost film. This light contact is sufficient to retain the film stack resting on the roller 6 supported on the sloping stack holder 2.

In order to dispense a film from the stack the roller 6 (that is to say the stack support member) is moved to notch 13. Then the top of the sheet separator member 8 abuts against the next-to-topmost film through the notch 13. The topmost film is free then to fall out of the stack over the sheet separator member 8 but it may not do so if the friction forces between the topmost and the next-to-topmost films are greater than the forces exerted on the film by gravity.

To ensure separation of the topmost film the roller is moved back towards the centre of the film stack. Alternatively it can be moved slightly towards the other edge of the film stack; travel in this direction being limited by the cut-out portion 3. The sheet separator member which abuts the next-to-topmost film slides under the topmost film so separating this film from the stack. The topmost film then slides out of the stack into a chute in the dispensing device which is not shown. As hereinbefore stated this chute may be attached by a device for loading a cassette and thus the film can be fed straight into the open ended exit.

Thus in order to dispense films from the stack the roller is moved backwards and forwards by means, for example, of a handle 20 positioned outside the framework of the sheet dispenser. Thus, the handle 20 is linked to the pendulum 4 by any conventional and operational connecting means. When the handle 20 is moved up and down, the stack support member will correspondingly move to the left or right. In this manner, the sheet separator member 8 is moved from notch to notch in superposed films in the stack. When enough sheets have been dispensed the roller 6 is returned to the centre portion of the stack between the two discontinuous row of notches.

As the roller 6 mounted on the pendulum 4 is moved from side to side to separate the sheets of film from the stack it describes a small arc. This movement causes the film stack to move up and down slightly on the roller 6 and this gentle action helps to agitate the film stack and thus to keep the bottom edges of all the sheets of film in contact with the roller 6.

I claim:

1. A sheet dispenser for dispensing sheets from a stack one at a time, each sheet having a notch along the bottom edge as it is held in the stack, the stack comprising alternate first and second sheets with the notch in all the first sheets being aligned in a first row and the notch in all the second sheets being aligned in a second row, the dispenser comprising a housing in which the stack is inclined vertically in a stack holder, the bottom the the stack resting on a side-ways movable stack support member, to one end of which is attached a sheet separator member which in the inoperative position of the dispenser abuts a face-portion of the bottom edge of the topmost sheet of the stack thus keeping the stack in the holder, the abutted portion of the sheet being smaller than any notch in the sheets of the stack, said stack support member being mounted on one end of a pendulum which is positioned on the opposite side of the stack holder to that side which supports the film stack, the said pendulum being pivotally mounted so that the sheet separator member, which is mounted on the stack support member which is in its turn mounted on the pendulum, is caused to abut the film stack; together with means to move the stack support member across and beneath the sheet stack so that the sheet separator member is stopped at the notch position in the topmost sheet thus abutting the next-to-topmost sheet so enabling the topmost sheet to fall by gravity from the stack over the sheet separator member and means to move the stack support member in the opposite direction which causes the topmost sheet to separate from the stack if it has not already separated, the said stack support member being so mounted in relation to the stack holder that the sheet separator member always abuts either the topmost sheet in the stack or the next-to-topmost sheet through the notch in the topmost sheet.

2. A sheet dispenser according to claim 1 wherein the stack holder is pivotally mounted so that the topmost film thereon is biassed towards the sheet separator member mounted on the stack holder.

3. A sheet dispenser according to claim 2 wherein the stack support member is a roller which is free to rotate.

4. A sheet dispenser according to any one of claims 1 or 2 wherein the stack support member is moved by means connected to a handle which is located outside the framework of the sheet dispenser.

* * * * *